April 5, 1966 W. E. REDDING 3,243,888
LEVEL
Filed March 11, 1963 2 Sheets-Sheet 1

INVENTOR.
WARREN E. REDDING
BY
Paul E. Mullendore
ATTORNEY

April 5, 1966     W. E. REDDING     3,243,888
LEVEL
Filed March 11, 1963     2 Sheets-Sheet 2
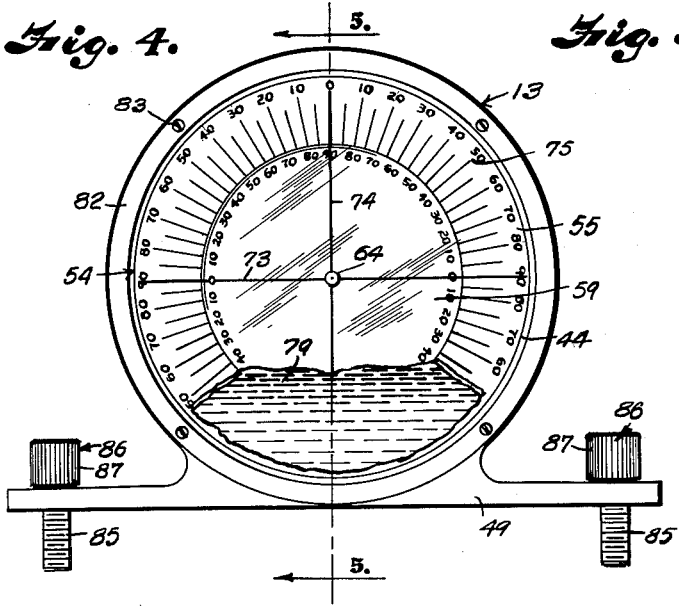
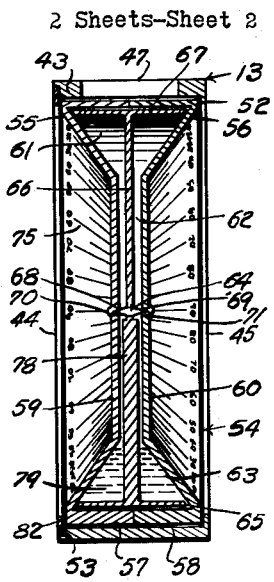
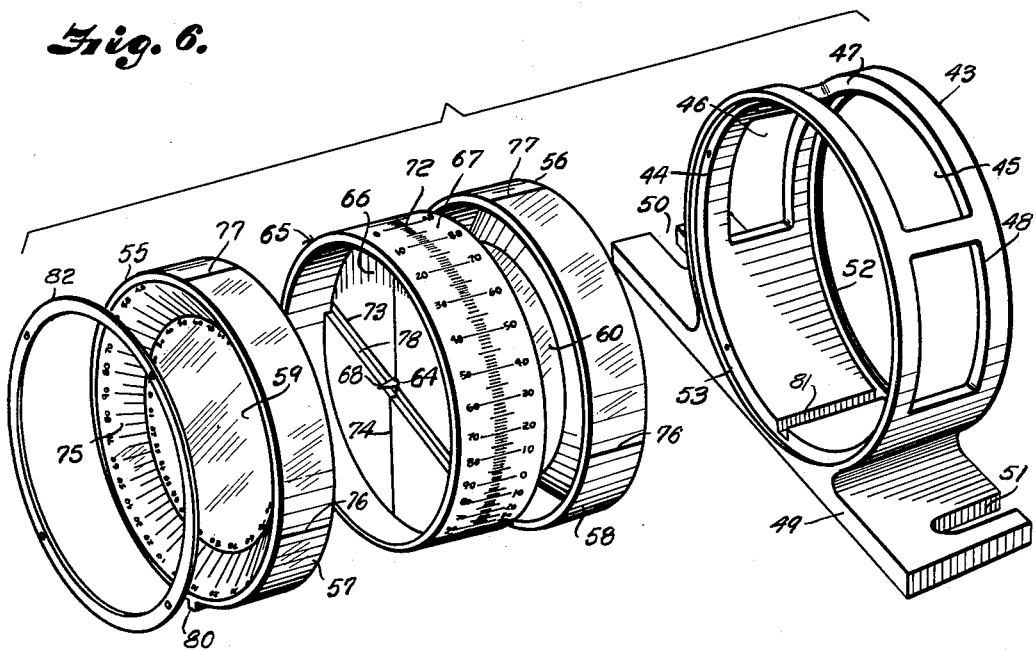
INVENTOR.
WARREN E. REDDING
BY
*Paul E. Mullendore*
ATTORNEY United States Patent Office 3,243,888
Patented Apr. 5, 1966

3,243,888
LEVEL
Warren E. Redding, Kansas City, Kans.
(6020 Kansas Ave., Muncie, Kans. 66057)
Filed Mar. 11, 1963, Ser. No. 264,240
12 Claims. (Cl. 33—208)

This invention relates to improvements in levels of the type used by carpenters, masons, pipefitters, and other mechanics, for determining vertical and horizontal positions or degrees of slope relative to horizontal and vertical positions, and has for its principal object to provide a level that is adjustable for length and which may be read from above, either side, or either end of the level.

Further objects of the invention are to provide a level of this character with a simple gravity actuated indicating means; to provide an adjustable level wherein the parts thereof, including the indicating means, are of rugged construction, so that the level may be adjusted to its shortest length and placed in a tool box along with other tools; to provide a level consisting of telescoping members that are easily extendible for length and securely tightened to retain linear alignment of the leveling surfaces thereof; to provide a level wherein the indicating means thereof may be removed and used as a pocket level; and to provide for dampening movement of the operating part of the indicating means.

Another object of the invention is to provide a level body structure wherein the parts are readily extruded from one of the light weight metal alloys, in order to provide an inexpensive, light weight device.

A further object of the invention is to provide a constant check that the indicator is level by comparison with the level of the dampening fluid.

In accomplishing these and other objects of the invention as hereinafter described, I have provided improved structure, the preferred form of which is illustrated in the accompanying drawings, wherein:

FIG. 4 is an enlarged perspective view of the indicating device of the level, removed therefrom.

FIG. 5 is a cross section on the line 5—5 of FIG. 4.

FIG. 6 is a perspective view of the parts of the indicating device, shown in disassembled, spaced relation.

Figure 1:
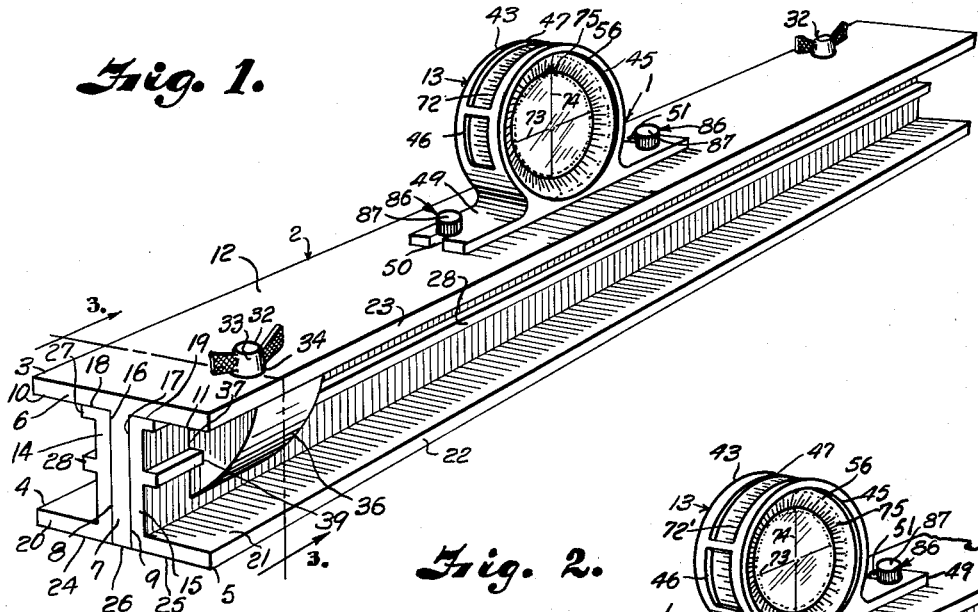
FIG. 1 is a perspective view of an extendible level constructed in accordance with the present invention, and showing the level adjusted to its shortest length.

Referring more in detail to the drawings:

1 designates a level constructed in accordance with the present invention, and which includes an elongated body 2. The body 2 comprises a central member 3 and telescoping side members 4 and 5 which are slidable along opposite sides of the central member to project the ends thereof from outer opposite ends of the central member 3 when changing the length of the level, as later described. The members 3, 4 and 5 are of a cross sectional shape to permit extrusion thereof from one of the light weight metal alloys, in order to provide a light weight level having a minimum of machining operations.

The central member 3, therefore, is preferably of T shape cross section, to provide a head flange 6 and a depending web flange 7 having outer faces 8 and 9 forming right angles with under faces 10 and 11 of the head flange 6. The upper face 12 of the head flange 6 is preferably flat, to seat thereon an indicating device 13, later described.

The side members 4 and 5 are generally of angle shaped cross section, to provide vertical flanges 14 and 15, having flat faces 16 and 17 abutting the outer faces 8 and 9 of the web flange 7. The vertical flanges 14 and 15 are preferably of a width corresponding to the depth of the web flange 7 when the edges 18 and 19 abut the under faces 10 and 11 of the head flange 6 of the central member 3.

The side members 4 and 5, being of angle cross section, have laterally extending horizontal flanges 20 and 21, with their outer edges 22 preferably registering with outer edges 23 of the head flange 6. The under faces 24 and 25 of the lateral flanges 20 and 21 cooperate with the bottom edge face 26 of the web flange of the central member, to provide a leveling face of the level parallel with the flat upper face 12 of the head flange.

In order to increase the bearing contact of the edges 18 and 19 of the vertical flanges 14 and 15 with the under faces 10 and 11 of the head flange, the vertical flanges have outwardly extending ribs 27. The vertical flanges are also provided, intermediate the ribs 27 and the horizontal flanges 20 and 21, with longitudinally extending ribs constituting keeper flanges 28, for a purpose later described.

The side members 4 and 5 are preferably the same length as the central member 3, so that when the body of the level is in its shortest telescoped position, as shown in FIG. 1, the total length of the level is no more than the length of the central member, so that it may be readily placed in a tool box, along with other tools, and may be used as a level having a moderate length. The side members 4 and 5 are clamped within the angles formed between the head and web flanges 6 and 7 of the central section, so that the under faces 24 and 25 of the horizontal flanges 20 and 21 are always kept in parallel alignment with the flat upper face 12 of the head flange 6, as now to be described.

Figure 3:
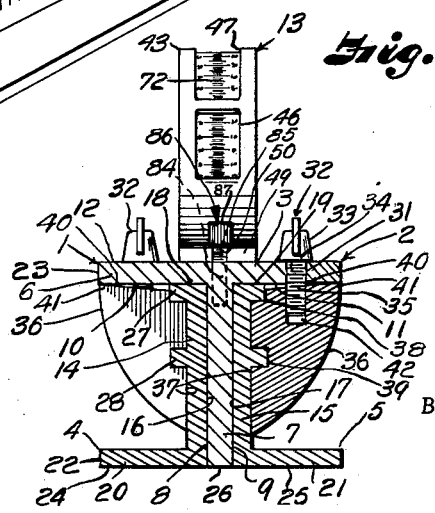
FIG. 3 is a cross section on the line 3—3 of FIG. 1, particularly illustrating one of the clamping blocks for retaining the telescoping elements in wedged or locked position.

Opposite ends of the head flange 6 of the central member 3 are provided with openings 31 (FIG. 3) that extend completely through the head flange 6 to rotatably mount thumb screws 32 having heads 33 forming stop shoulders 34 with externally threaded shanks 35 which carry clamping blocks 36. The clamping blocks 36 are also formed of a light weight metal alloy and are of a shape and size to seat within the angles between the outer faces of the vertical flanges 14 and 15 and the under faces 10 and 11 of the head flange 6, as best shown in FIG. 3. The blocks 36, therefore, have flat inner faces 37 provided with a transverse notch 38 to accommodate the upper ribs 27 and lower transverse grooves 39 to receive therein the keeper flanges 28 and 28. The upper end faces 40 of the blocks 36 are formed on obtuse angles with respect to the flat faces 37, whereby the outer corners 41 of the blocks constitute fulcrums bearing against the outer portions of the under faces 10 and 11 of the head flange, and on which the blocks rock to tighten and wedge the side members 4 and 5 against the outer faces of the web flange and to bring the extended bearing edges 18 and 19 thereof into firm contact with the under faces 10 and 11 of the head flange 6 and the faces 37 of the blocks 36 upon tightening of the thumb screws 32. In order to connect the shanks of the thumb screws with the blocks, the blocks have internally threaded sockets 42 to accommodate the threads of the shanks, as best shown in FIG. 3.

It is thus apparent that when the thumb screws are tightened, the blocks hold the side members 4 and 5 rigidly to the central member; however, when a level of longer length is desired, the thumb screws 32 may be loosened to loosen the blocks 36 so that the blocks may rock downwardly on their fulcrums 41 and free the side members 4 and 5 for sliding movement thereof along the outer faces of the web 7, until the ends are projected the desired distance, whereupon the thumb screws 32 may be retightened to pivot the blocks 36 and draw the vertical flanges 14 and 15 of the side members 4 and 5 into the angle formed between the web 7 and head flange 6 of the central member, so as to retain the leveling faces 24 and 25 of both side members in plane with the bottom edge 26 of the web 7 and parallel with the plane of the flat upper face 12.

The indicating means 13 must be of a construction and mounted on the central member 3 so as to not interfere with adjustment of the length of the level. The indicating means 13 is best illustrated in FIGS. 4 to 6, inclusive, and includes a cylindrical cage 43 having open sides 44 and 45 and arcuate shaped openings 46, 47 and 48 in the periphery thereof, as best shown in FIG. 6. The cage 43 is substantially tangentially mounted upon a base plate 49 that may be integrally formed therewith and which has slots 50 and 51 at the respective ends thereof, the slot 50 opening from one end of the base plate, and the slot 51 opening from a side of the opposite end of the base plate, as shown in FIG. 6, so as to facilitate removal of the indicating device from the body of the level, as later described.

One side opening 44 of the cage is encircled by an inwardly extending stop flange 52, while the opposite side opening is encircled by an inset shoulder 53 to mount the inner unit 54 of the indicating means, as now to be described.

The unit 54 includes disk shaped lenses 55 and 56 having inturned peripheral flanges 57 and 58 substantially conforming to the inner diameter of the cage 43. The disk portions of the lenses have central portions 59 inset inwardly by conical webs 60 to provide inner annular recesses 61 (FIG. 5) at the inner sides of the lenses. The lenses, when placed with the flanges in abutting engagement, are of a total width so that when the periphery of the lens 56 abuts against the stop flanges 52, the corresponding outer edge of the lens 55 registers with the inset shoulder 53 of the cage and the central disk portions 59 and 60 of the respective lenses are spaced apart as indicated at 62, FIG. 5, to cooperate with the recesses 61 in providing a closed compartment 63.

Mounted in the enclosure on a spindle 64 is a rotor 65 having a central disk portion 66 arranged to work within the space 62, and the periphery thereof carries a circular band 67 concentric with the spindle 64. The spindle 64 is mounted in the axis of the central portion 59 of the rotor and has conical ends 68 and 69 journaled in conical recesses 70 and 71 on the inner facing sides of the disk portions of the lenses.

The circular band is of a width to extend across the arcuate sight openings in the periphery of the cage, and carries a protractor scale 72. The protractor scale 72 has readings progressing in opposite directions from horizontal and vertical indicating lines 73 and 74 marked on the central disk portion of the rotor. The conical portions of the lenses are provided with similar protractor scales 75 that cooperate with the vertical and horizontal lines 73 and 74 when reading the level. The flange portions of the lenses have transverse marks 76 and 77 (FIG. 6) cooperating with the protractor scales on the rotor.

In order to oscillate the rotor responsive to gravity, one diametrical side of the disk portion 66 thereof is weighted, as by increasing the thickness of the disk portion as shown at 78 in FIGS. 5 and 6, so that when the parts are assembled the indicating lines 73 and 74 on the rotor are at all times maintained in vertical and horizontal positions, respectively, as shown in FIG. 4.

In assembling the unit, the rotor is placed within the center of one of the lenses with the spindle 64 entering the conical recess, and a quantity of dampening and lubricating fluid, as indicated at 79 in FIGS. 4 and 5, is poured into the concave portion of the lens. The other lens is seated over the rotor so that the recess thereof engages the spindle and the edges of the flange portions thereof come into abutment with each other. The abutting edges of the flanges are then sealed together by fusing or by the use of a suitable plastic cement.

The unit thus assembled is placed within the cage, with the marks 76 and 77 positioned in horizontal and vertical planes with respect to the base plate 49 and retained in that position by means of lugs 80 on the flanges 57 and 58 engaging in a groove 81 of the cage. With the unit in position, it is retained in the cage by a ring 82 inset against the shoulder 53 and secured thereto by suitable fastening devices, such as screws 83.

In order to fasten the base plate 49 of the cage on the upper face of the head flange of the central section of the level, the head flange is provided with internally threaded sockets 84, registering with the inner ends of the slots 50 and 51. Externally threaded shanks 85 of thumb screws 86 are then inserted through the slots to the base plate and turned within the sockets so that heads 87 of the screws draw the base plate 49 into firm contact with the head flange 6 of the central member 3 of the level.

When it is desired to remove the indicating means for use as a pocket level, the thumb screws 86 may be loosened slightly so that the end of the base plate having the laterally opening flange may be swung laterally to free that end of the base plate, while the opposite end of the base plate is pivoted on its retaining screw. As soon as the lateral slot clears the head of the thumb screw at that end of the base plate, the base plate may be shifted in a longitudinal direction, to remove the opposite end of the base plate from its retaining screw.

The level constructed as described may be carried in a tool box in the compact condition shown in FIG. 1, the thumb screws 32 being tightened to retain the blocks 36 in clamping engagement with the side members 4 and 5.

Figure 2:
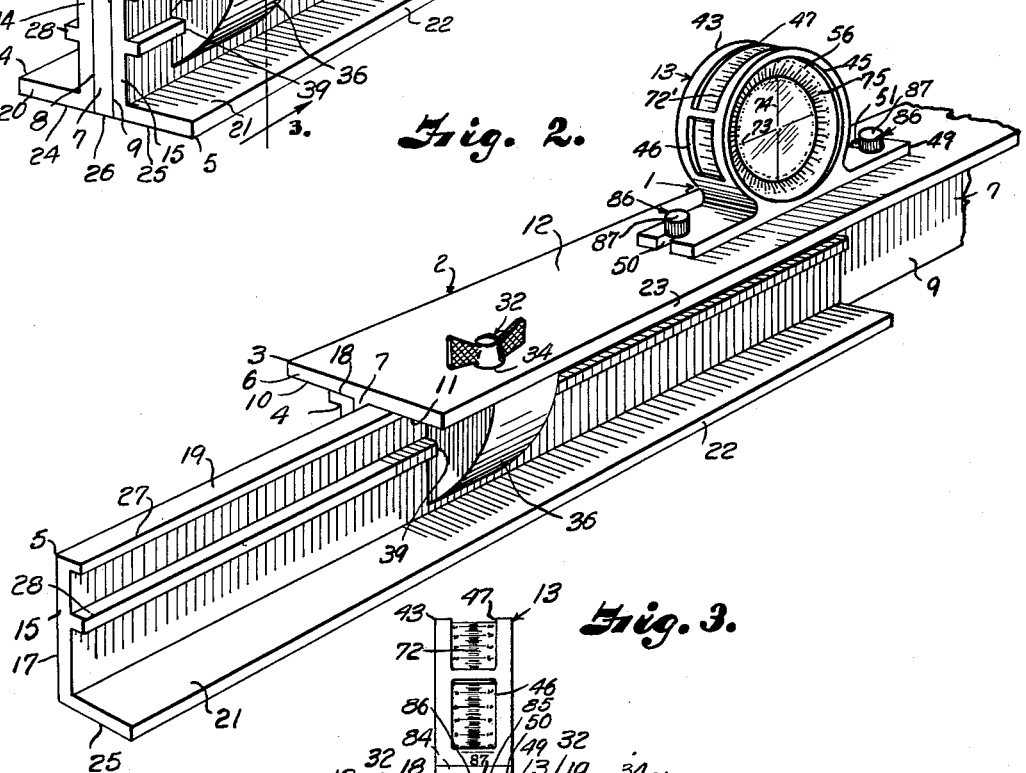
FIG. 2 is a similar perspective view of one end of the level, showing extension of one of the telescoping members of the level.

In using the level, it is adjusted to the length desired by loosening the thumb screws to free the blocks 36, whereupon the side members 4 and 5 may be projected from opposite ends of the central member 3 to provide a level of the desired length, as shown in FIG. 2. The thumb screws 32 are retightened to hold the side members 4 and 5 in the adjusted position.

If the level is used to obtain a vertical reading, the leveling faces are placed against the member to be checked, whereupon the rotor 65 will swing responsive to gravity so that the line 74 is in perpendicular position. The level may be read through either of the side lenses 55 or 56 by noting the registration of the line 74 with the graduations of the protractor scales 75. The level of the rotor 65 may also be checked with the surface level of the dampening fluid. The level may also be read through the sight opening 47 by noting the position of the lines 76 or 77 with respect to the protractor scale 72 on the rotor 65.

If the level is to be used horizontally, the protractor scale 72 may be read through any one of the sight openings 46, 47 or 48, or the protractor scales 75 may be read from either side of the level.

If the indicating device 13 is to be used as a pocket level, on a line or the like, the thumb screws 86 are loosened so that the base 49 of the indicating device may be removed from the thumb screws. The bottom face of the base 49 may be used as a leveling surface.

What I claim and desire to secure by Letters Patent is:
1. A level, including
   a central member of generally T shape in cross section to provide a head and a coextensive depending web
   level indicating means,
   means anchoring the level indicating means on said head flange,
   side members slidable in opposite directions along opposite sides of the depending web and projectable from ends thereof to provide a leveling face of various lengths, and means for wedging said side members into angles provided between said head and web of the central member for retaining adjustment of the level to a desired length.

2. A level, including
an elongated member having a cross section to provide a head flange and a depending web flange,
level indicating means,
means anchoring the level indicating means on said head flange,
an angle member projectable from an end of the elongated member and having one flange in sliding contact with the web flange and bearing contact with the head flange,
a longitudinal rib on said one flange providing a keeper flange,
a block having a groove for engaging under said rib, and
means for tightening the block to the under side of the head flange to clamp the angle member to the web flange when the angle member is adjusted to attain a level of desired length.

3. A level, including
a central member of T cross section to provide a head flange and a central depending web flange,
level indicating means,
means anchoring the level indicating means on said head flange,
angle members having vertical flanges projectable in opposite directions along opposite sides of the web flange in bearing contact with the head flange and having lateral flanges to cooperate in providing a leveling face of various lengths, and
means carried by the head flame to wedge the angle members into angles provided between the head and web flanges of the central member after a leveling face of desired length it attained.

4. A level, including
an elongated central member of T cross section to provide a head flange and a central depending web flange,
level indicating means,
means anchoring the level indicating means on said head flange,
angle members having vertical flanges projectable in opposite directions along opposite sides of the web flange in bearing contact with the head flange and having lateral flanges to cooperate in providing a leveling face of various lengths,
said vertical flanges each having a longitudinal rib providing a keeper flange,
blocks having inner faces contacting outer faces of the vertical flanges and provided with grooves for engaging said keeper flanges, and
means carried by the head flange for tightening the blocks against the under sides of the head flange to wedge the angle members into angles provided between the head and web flanges of the central member after a leveling face of desired length is attained.

5. A level as described in claim 4,
in which the blocks are fulcrumed on the under side of the head flange to the wedging action.

6. A level, including
an elongated central member of T cross section to provide a head flange and a central depending web flange,
level indicating means,
means anchoring the level indicating means on said head flange,
angle members having vertical flanges projectable in opposite directions along opposite sides of the web flange in bearing contact with the head flange and having lateral flanges to cooperate in providing a leveling face of various lengths,
said vertical flanges each having a longitudinal rib providing a keeper flange,
blocks having inner faces contacting outer faces of the vertical flanges and provided with grooves for engaging said keeper flanges, and
thumb screws having shanks journaled in said head flange and having thread ends engaged in the threaded sockets of said blocks, for tightening the blocks against the under sides of the head flange to wedge the angle members into angles provided between the head and web flanges of the central member to retain said length adjustment.

7. A level as described in claim 6,
in which the blocks also have fulcruming contact with the under sides of the head flange to enhance the wedging action.

8. A level including
an elongated central member of T cross section to provide a head flange and a central depending web flange,
level indicating means,
means anchoring the level indicating means on said head flange,
angle members having vertical flanges projectable in opposite directions along opposite sides of the web flange in bearing contact with the head flange and having lateral flanges to cooperate in providing a leveling face of various lengths,
said vertical flanges having longitudinal upper and lower ribs with the upper ribs extending the bearing contact with the head flange of the central member and the lower rib providing a keeper flange,
blocks having grooves for engaging under said ribs, and
means carried by the head flange for tightening the blocks against the under sides of the head flange to clamp the angle member to the web flange when the members are adjusted in attaining a leveling face of desired length.

9. A level, including
an elongated body having an upper face parallel with a bottom leveling face of said body,
a base seated upon the upper face,
means for removably anchoring the base to said upper face,
a cylindrical cage on the base with its axis extending transversely of the upper face to provide circular sight openings at the sides of the level and arcuate sight openings visible from the respective ends and from above the level, and
a gravity responsive rotor within said cage and oscillatable about said axis to indicate levels through said sight openings.

10. A level, including
an elongated body having an upper face parallel with a bottom leveling face of said body,
a base seated upon the upper face,
means for removably anchoring the base to said upper face,
a cylindrical cage on the base with its axis extending transversely of the upper face to provide sight openings at the sides of the level and sight openings visible from the respective ends and from above the level,
lenses contained within said cage and having disk portions covering the side openings and inturned annular flanges covering the arcuate openings to provide a transparent enclosure,
a rotor in the enclosure and having a peripheral protractor scale visible through the sight openings,
means for mounting the rotor in said enclosure, and
means for weighting one diametrical side of the rotor whereby movement of the rotor is responsive to gravity, said disk portions of the lenses having circular protractor scales visible through the sight openings at the sides of the cage, said cage and sides of the rotor having zero markings cooperating with the respective protractor scales whereby levels are taken from the top, both sides, and ends of the level.

11. A level, including a central elongated member, elongated side members projectable in opposite directions along opposite sides of the central member, means for clamping the side members to the central member in adjusted positions thereof, a base seated upon the central member, means for removably anchoring the base to said central member, a cylindrical cage on the base with its axis extending transversely of the central member to provide circular sight openings at the sides of the level and arcuate sight openings visible from the respective ends and from above the level, and a gravity responsive rotor within said cage and oscillatable about said axis to indicate levels through said sight openings.

12. A level, including a central member of T cross section to provide a head flange and a central depending web flange, angle members having vertical flanges projectable in opposite directions along opposite sides of the web flange in bearing contact with the head flange and having lateral flanges to provide a leveling face of adjustable length, said vertical flanges each having a longitudinal rib providing a keeper flange, blocks having inner faces contacting outer faces of the vertical flanges and provided with grooves for engaging said keeper flanges, means for tightening the blocks against the under sides of the head flange to wedge the angle members into angles provided between the head and web flanges of the central member when the leveling face is adjusted to desired length, a base seated upon the head flange of the central member, means for removably anchoring the base to said head flange, a cylindrical cage on the base with its axis extending transversely of the upper face to provide circular sight openings at the sides of the level and arcuate sight openings visible from the respective ends and from above the level, and a gravity responsive rotor within said cage and oscillatable about said axis to indicate levels through said sight openings.

References Cited by the Examiner

UNITED STATES PATENTS

| | | | |
|---|---|---|---|
| 633,589 | 9/1899 | Hinkson et al. | 33—215.1 |
| 933,912 | 9/1909 | Matter | 33—220 X |
| 948,777 | 2/1910 | Tuomi | 33—207 |
| 964,066 | 7/1910 | Sprenkle | 33—215.1 X |
| 1,177,709 | 4/1916 | Keefauver | 33—208 X |
| 1,346,619 | 7/1920 | Weathersby | 33—207 |
| 2,691,829 | 10/1954 | Bryan Arana | 33—207 |
| 2,847,765 | 8/1958 | Bateman | 33—215.1 |
| 2,990,622 | 7/1961 | Johnson | 33—215.1 |

LEONARD FORMAN, *Primary Examiner.*

ISAAC LISANN, *Examiner.*

J. H. BARKSDALE, *Assistant Examiner.*